United States Patent Office 3,399,873
Patented Sept. 3, 1968

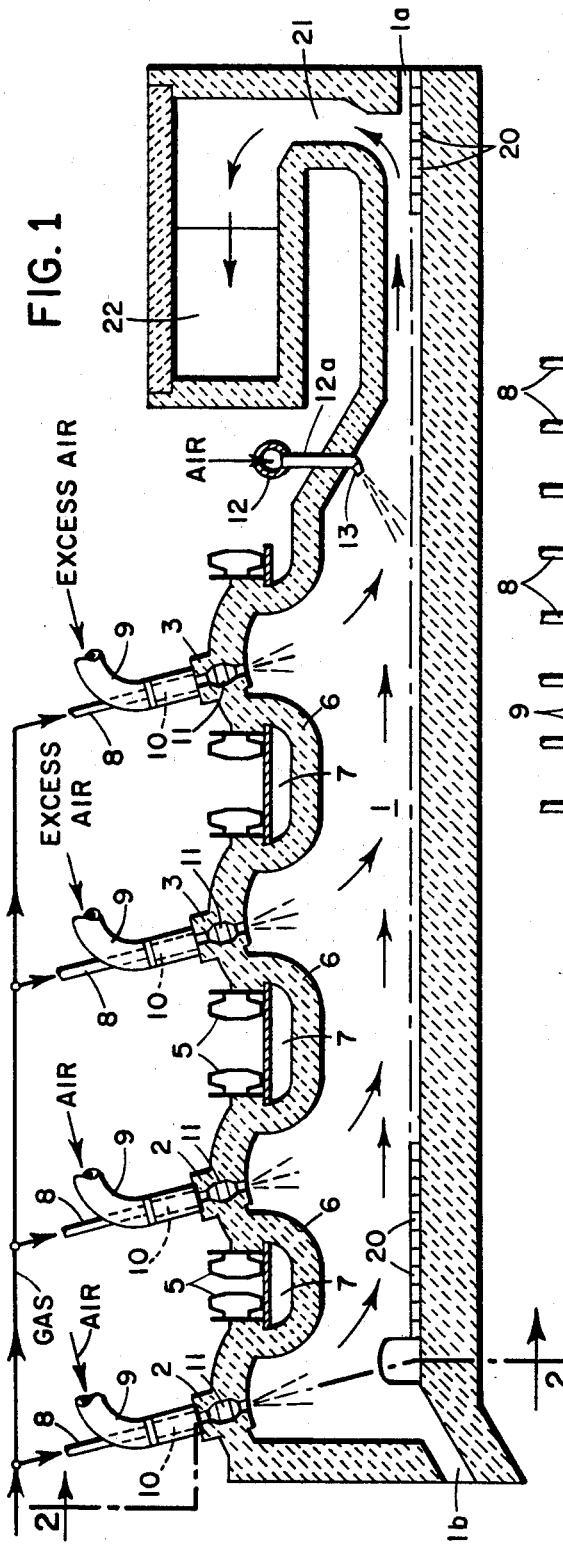

3,399,873
FURNACE FOR SCALELESS DIRECT HEATING OF METAL CHARGE DESTINED TO HEAT-TREATMENT
Kazimierz Dybal, Bytom, and Zygmunt Oglaza, Eugeniusz Stwora, and Kazimierz Suchon, Gliwice, Poland, assignors to Biuro Projektow Przemyslu Hutniczego, Gliwice, Dubois, Poland
Filed July 26, 1966, Ser. No. 567,886
Claims priority, application Poland, July 26, 1965, P 110,205
9 Claims. (Cl. 263—15)

ABSTRACT OF THE DISCLOSURE

A furnace for scaleless direct heating of a metal charge comprising a heating chamber for housing the charge and having two sets of burners adapted to direct an air-fuel mixture into the chamber, one of the air-fuel mixtures having a deficiency of air and the other having an excess of air.

---

In known furnaces for heating a metal charge the charge undergoes a superficial oxidation. The scale formed as a result of the oxidation is in an amount of 2–4%, and causes not only metal losses but also difficulties in removing the scale from the surface of the metal charge, as well as from the hearth and other parts of the furnace.

The cause of forming the scale by such a type of heating is a notable content of $O_2$, $CO_2$ and $H_2O$ in combustion gases.

It is therefore an object of the present invention to provide a furnace for scaleless heating which has none of the above mentioned faults and which renders it possible to heat the charge directly with inactive combustion gases produced by combustion of coke-oven gas or natural gas in the vicinity of the charge, at increased content of CO and $H_2$, diminished content of $CO_2$ and $H_2O$, and with complete elimination of the presence of $O_2$ in combustion gases.

According to the above, the most economical heating is achieved as the charge is immediately rinsed with combusion gases which by themselves form a protective atmosphere.

The furnace of the present invention is shown by means of an exemplary embodiment in the accompanying drawings, in which FIG. 1 shows a longitudinal section and FIG. 2 a cross section of the furnace.

As shown in FIG. 1 the furnace consists of a heating chamber 1 having an inlet 1a and an outlet 1b, with burners 2 and 3 fitted in arch vaults 4 underslung on steel plate griders 5 covered with suspended arch vaults 6, to form pressure compensation chambers 7. A charge in the form of ingots 20 is disposed at the bottom of chamber 1.

Gas is fed through a pipeline 8 and air through a pipeline 9 to a premixing chamber 10, and then to the high-temperature mixing chamber 11. The air-fuel ratio is such that a partial decomposition of the methane at an air deficiency occurs in the burners 2.

Gas is fed with an excess air into chamber 1 through furnace 3, and pure air is supplied into the chamber 1 through manifold 12 as will be discussed in detail later.

The operation of the above described furnace for scaleless heating of the charge is as follows:

Gas is fed through the pipeline 8, and the primary air of a temperature of 600° C. through the pipeline 9, to the burners 2, the amount of air being deficient to cause complete combustion. In the chamber 10 a mixing of the gas with the hot air occurs, and the mixture then passes to the chamber 11, where, due to the reduced velocity of flow, the high temperature, the air deficiency and the small volume of the chamber 11, there occurs a decomposition of the methane and forming of soot.

The mixture of gas with air flowing out of the burners 2 in form of a stream is directed against the charge directly at a small angle, and, since it is burning, it causes an intensive heating of the charge and protects the charge against oxidizing agents.

As the amount of primary air in the burners 2 is not sufficient for a complete combustion of all the gases passed therethrough, these gases form an inactive atmosphere over the top of the charge which atmosphere is directed towards burners 3 and manifold 12.

Since burners 3 operate upon the same principle as burners 2, but with an excessive amount of air, a gradual combustion of the gases forming the atmosphere is effected.

The combustion gases resulting from the above-mentioned gradual combustion then pass to the vicinity of manifold 12 through which air is supplied to pipes 12a and nozzles 13 into the chamber 1 in the form of streams directed in an oblique path opposite the flow of the combustion gases and extending across the entire width of the chamber 1. This results in a mixing of the air and combustion gases and a resultant combustion.

Finally, the gases resulting from this latter combustion pass through a combustion channel 21 to a gas recycling manifold 22 disposed outside the chamber 1.

What we claim is:

1. A furnace for scaleless direct heating of a metal charge, comprising a heating chamber for housing said charge, a first set of burners disposed adjacent one end of said chamber and adapted to direct a burning air-fuel mixture into said chamber towards the other end thereof, said air-fuel mixture having a deficiency of air for complete combustion, and a second set of burners adjacent said other end of said chamber and adapted to direct a burning air-fuel mixture into said chamber, said latter air-fuel mixture having an excess amount of air for complete combustion.

2. The furnace of claim 1, further comprising means to inject a predetermined amount of air into said chamber adjacent said other end thereof.

3. The furnace of claim 2, wherein said predetermined amount of air is directed towards said one end of said chamber.

4. The furnace of claim 1, wherein said second set of burners is adapted to direct its air-fuel mixture into said chamber at an angle extending towards said one end of said chamber.

5. The furnace of claim 1, wherein said chamber has an inlet and outlet for said charge formed therein, and wherein said first set of burners is located adjacent said outlet end of said burner and said second set of burners is located adjacent said inlet end of said burner.

6. The furnace of claim 1, wherein the upper portion of said chamber is formed by a plurality of transversely extending arches to define separate heating zones, said burners extending through said upper portion of said chamber.

7. The furnace of claim 1, wherein said burner is provided with an outlet for combustion gases.

8. The furnace of claim 1, wherein said chamber is longitudinal and wherein said charge is located on the bottom thereof.

9. Furnace for scaleless direct heating of ingots, comprising a cross furnace arranged along the vault of the chamber, said cross furnace being arranged with burners directing the flame onto the ingots, and so eliminating an access to them of the air from the ambient atmosphere through windows and doors of the furnace, the burners arranged near the outlet of said ingots burning the gas at an air deficiency forming a non-oxidizing protecting zone, and the burners arranged near the inlet of said ingots burning at an excess air; and air nozzles arranged in the end zone of the vault in order to achieve a complete combustion of intentionally incompletely burned parts of the gases by said burners.

References Cited

UNITED STATES PATENTS

| 2,848,207 | 8/1958 | Rusciano | 263—15 |
| 3,022,057 | 2/1962 | Schmidt et al. | 263—15 |
| 3,100,811 | 8/1963 | Bloom | 263—613 |
| 3,125,327 | 3/1964 | Williams | 263—15 |

FREDERICK L. MATTESON, JR., *Primary Examiner.*

A. D. HERRMANN, *Assistant Examiner.*